R. G. BLOXSOM.
GAGE.
APPLICATION FILED JULY 16, 1919.

1,371,844.

Patented Mar. 15, 1921.

WITNESSES
Bernard Abby
S. W. Foster

INVENTOR
Robert G. Bloxsom
BY Munn & Co
ATTORNEYS

UNITED STATES PATENT OFFICE.

ROBERT GERRY BLOXSOM, OF CAMDEN, NEW JERSEY.

GAGE.

1,371,844.

Specification of Letters Patent.

Patented Mar. 15, 1921.

Application filed July 16, 1919. Serial No. 311,184.

*To all whom it may concern:*

Be it known that I, ROBERT G. BLOXSOM, a citizen of the United States, and a resident of Camden, in the county of Camden and State of New Jersey, have invented a new and Improved Gage, of which the following is a full, clear, and exact description.

This invention relates to improvements in gages, an object of the invention being to provide in a single gage improved means for recording both pressure and vacuum.

A further object is to provide a gage with a stationary dial containing a scale indicating vacuum and having a movable pointer registering therewith, and also to provide a movable dial having a scale thereon registering with the zero mark or pointer of the fixed dial to indicate pressure.

With these and other objects in view the invention consists in certain novel features of construction, and combinations and arrangements of parts, as will be more fully hereinafter described and pointed out in the claims.

In the accompanying drawings—

Figure 6:
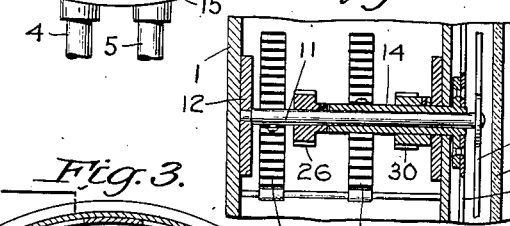
Figure 3:
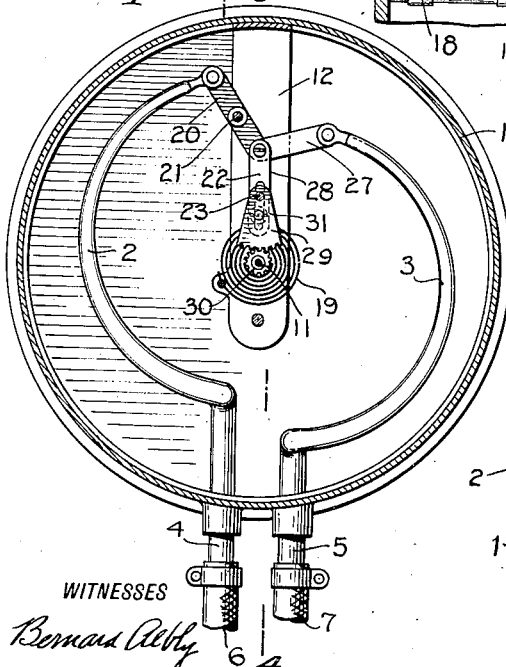
Fig. 3 is a view in transverse section.
Figures 4, 5:
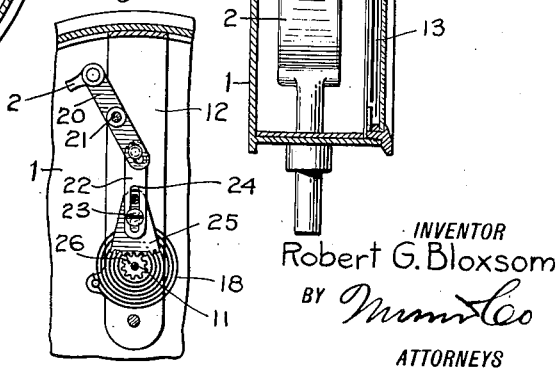
Fig. 4 is a view in section on the line 4—4 of Fig. 3.

Fig. 5 is a fragmentary view in vertical transverse section showing the segment 25 and its coöperating parts; and Fig. 6 is a fragmentary view in vertical section through the center of the gage, the view being on an enlarged scale with the segments 25 and 29 and their operating mechanism omitted.

1 represents a circular casing having two Bourdon tubes 2 and 3 therein having inlets 4 and 5 respectively projecting beyond the casing 1, and flexible pipes 6 and 7 connect the inlets with the pump or other device not shown in which both pressure and vacuum is to be indicated.

The casing 1 is provided at its front with a transparent cover 8 and back of the transparent cover with a fixed dial 9. A pointer 13 registers with the fixed dial 9 and is secured upon an arbor 11 mounted centrally in the casing and supported by a suitable frame 12. A movable dial 10 is mounted in the casing and within the fixed dial 9 and is supported by a spider 9' which is fixed to a sleeve 14 mounted to turn on the arbor 11. The fixed dial 9 and movable dial 10 are provided with scales 16 and 17 respectively, as clearly shown, the scale of the movable dial registering with the fixed pointer 13 at the zero of the scale on the fixed dial.

The Bourdon tube 2 is connected at its inner end to one end of a lever 20, the latter pivotally supported between its ends on a shaft 21 in the frame 12. The other end of the lever 21 is connected to one end of a second lever 22, which is pivotally supported on a shaft 23 in the frame 12, and at its opposite end has a slot and pin connection 24 with a segment 25. The segment 25 oscillates on the shaft 23 and meshes with a pinion 26 fixed to the arbor 11. The Bourdon tube 3 at its inner end is connected by a link 27 with one end of a lever 28, the latter pivotally supported between its ends on the shaft 23 and at its lower end having a slot and pin connection 31 with a segment 29, the segment 29 mounted to oscillate on the shaft 23 and meshing with the pinion 30 on the sleeve 14.

The operation is as follows: In recording vacuum the Bourdon tube 2 causes a movement of levers 20 and 22 to move the segment 25 and pinion 26 causing the pointer 13 to register with the fixed dial 9. To record pressure the Bourdon tube 3 causes the movement of link 27, lever 28, segment 29 and pinion 30 to move the sleeve 14 and movable dial 10 causing the latter to register with the fixed zero pointer 15.

Figure 1:
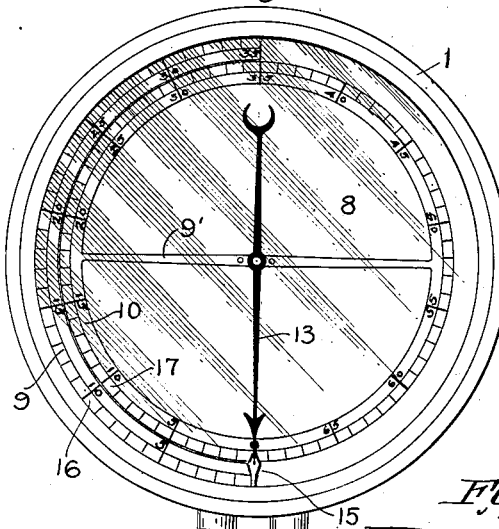
Figure 1 is a view in front elevation with the parts in normal zero position.
Figure 2:
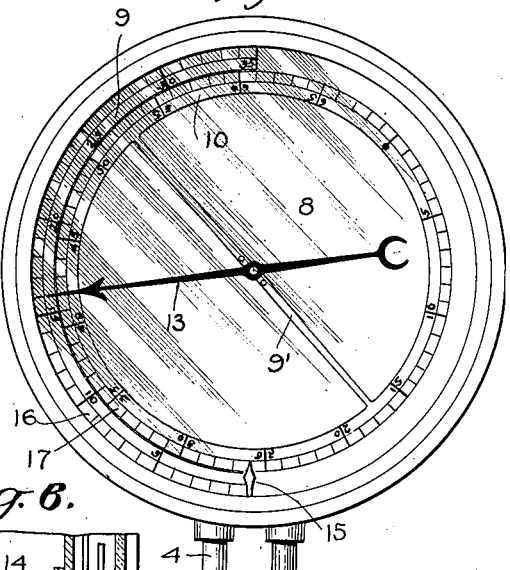
Fig. 2 is a similar view showing the gage registering both pressure and vacuum.

By reference to Fig. 2, it will be noted that the vacuum indicated is sixteen and the pressure twenty-six, the parts having moved, as above explained, to indicate both pressure and vacuum.

By reason of the fact that I connect the inlets 4 and 5 with the pump or other device, in which pressure and vacuum are to be indicated, vibrations are not transmitted to the gage and the device will operate with greater efficiency and without liability of injury.

The springs 18 and 19 hold the arbor 11 and sleeve 14 in normal zero position and return such parts to such position.

By reason of the measurement of both pressure and vacuum, the total head is recorded in any pump or similar device in which pressure and vacuum are utilized or caused.

Various slight changes may be made in the general form and arrangement of parts described without departing from the invention, and hence I do not limit myself to the precise details set forth but consider myself at liberty to make such changes and alterations as fairly fall within the spirit and scope of the appended claims.

I claim:

1. A combination vacuum and pressure gage comprising a casing, a fixed dial in the casing, an arbor secured in the casing, a pointer in the casing revoluble upon said arbor and registering with the fixed dial, a movable dial in the casing inclosed within the fixed dial, a sleeve secured to said movable dial and revoluble around said arbor, said movable dial registering with the zero point on said fixed dial, and means operated by vacuum and pressure respectively for revolving the movable dial and the pointer simultaneously in opposite directions.

2. A combination vacuum and pressure gage comprising a casing, a fixed pressure indicating dial within said casing, an arbor in said casing, a pointer registering with said dial revoluble on said arbor, a vacuum indicating dial adapted to turn within the pressure indicating dial and registering with the zero point thereon, and means adapted to simultaneously revolve said pointer and vacuum indicating dial in opposite directions.

ROBERT GERRY BLOXSOM.